US012076874B2

(12) United States Patent
Lee et al.

(10) Patent No.: US 12,076,874 B2
(45) **Date of Patent: *Sep. 3, 2024**

(54) SHAVING BLADE

(71) Applicant: DORCO CO., LTD., Seoul (KR)

(72) Inventors: Hyun Ju Lee, Seoul (KR); Kwang Choon Ryu, Seoul (KR); Min Joo Park, Seoul (KR)

(73) Assignee: Dorco Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,250

(22) Filed: Apr. 21, 2023

(65) Prior Publication Data

US 2023/0249371 A1 Aug. 10, 2023

Related U.S. Application Data

(63) Continuation of application No. 16/987,298, filed on Aug. 6, 2020, now Pat. No. 11,660,770.

(30) Foreign Application Priority Data

Oct. 1, 2019 (KR) ........................ 10-2019-0121755

(51) Int. Cl.
*B26B 21/60* (2006.01)
*B26B 21/56* (2006.01)

(52) U.S. Cl.
CPC .............. *B26B 21/60* (2013.01); *B26B 21/56* (2013.01)

(58) Field of Classification Search
CPC .......... B26B 21/60; B26B 21/56; B26B 21/58
(Continued)

(56) References Cited

U.S. PATENT DOCUMENTS 3,761,372 A 7/1971 Sastri
4,720,918 A * 1/1988 Curry ...................... B26B 21/58 30/346.5
(Continued)

FOREIGN PATENT DOCUMENTS

EP 2731760 12/2015
EP 3037226 7/2017
(Continued)

OTHER PUBLICATIONS

European Patent Office Application Serial No. 20194343.8, Search Report dated Feb. 19, 2021, 6 pages.
(Continued)

*Primary Examiner* — Nhat Chieu Q Do
(74) *Attorney, Agent, or Firm* — Knobbe Martens Olson & Bear LLP

(57) ABSTRACT

A shaving blade is proposed. The shaving blade includes a substrate having a cutting edge, a substrate tip, and a plurality of coating layers laminated on the substrate. A first thickness of the substrate is defined as a thickness measured at a first distance that is 8 micrometers from the substrate tip along a central axis. A second thickness of the substrate is defined as a thickness measured at a second distance that is 16 micrometers from the substrate tip along the central axis. A third thickness of the substrate is defined as a thickness measured at a third distance that is 32 micrometers from the substrate tip along the central axis. The plurality of coating layers include a first coating layer, a second coating layer, and a third coating layer, and contain one or more of chromium boride (CrB), chromium carbide (CrC), or Diamondlike carbon (DLC).

6 Claims, 3 Drawing Sheets

(58) Field of Classification Search
USPC .......................................................... 30/346.5
See application file for complete search history.

(56) References Cited

U.S. PATENT DOCUMENTS

| | | | |
|---|---|---|---|
| 5,687,485 | A | 11/1997 | Shurtleff et al. |
| 5,761,814 | A | 6/1998 | Anderson et al. |
| 5,956,848 | A | 9/1999 | Tseng et al. |
| 5,956,851 | A | 9/1999 | Apprille et al. |
| 6,041,926 | A | 3/2000 | Petricca et al. |
| 6,052,903 | A | 4/2000 | Metcalf et al. |
| 6,185,822 | B1 | 2/2001 | Tseng et al. |
| 6,212,777 | B1 | 4/2001 | Gilder et al. |
| 6,442,839 | B1 | 9/2002 | Tseng et al. |
| 6,516,518 | B1 | 2/2003 | Garraway et al. |
| 6,612,040 | B2 | 9/2003 | Gilder |
| 6,684,513 | B1 | 2/2004 | Clipstone et al. |
| 9,079,321 | B2 | 7/2015 | Claus et al. |
| 9,248,579 | B2 | 2/2016 | DePuydt et al. |
| 9,751,230 | B2 | 9/2017 | Skrobis et al. |
| 11,230,024 | B2 | 1/2022 | Papatriantafyllou et al. |
| 2013/0014395 | A1 | 1/2013 | Patel et al. |
| 2015/0328789 | A1 | 11/2015 | Skrobis et al. |
| 2017/0136640 | A1 * | 5/2017 | Skrobis .................. B26B 21/58 |
| 2017/0136641 | A1 * | 5/2017 | Siozios .................... B05D 5/08 |
| 2017/0348867 | A1 | 12/2017 | Papatriantafyllou et al. |
| 2018/0043561 | A1 | 2/2018 | Nisby et al. |
| 2020/0130211 | A1 * | 4/2020 | Skrobis .................. B26B 21/60 |
| 2021/0094199 | A1 | 4/2021 | Lee et al. |

FOREIGN PATENT DOCUMENTS

| | | | | |
|---|---|---|---|---|
| EP | 3372361 | | 9/2018 | |
| EP | 3372361 | A1 * | 9/2018 | ............ B26B 21/56 |
| EP | 3372362 | | 9/2018 | |
| WO | 8402104 | | 6/1984 | |
| WO | WO-2014074838 | A1 * | 5/2014 | .............. B26B 9/00 |
| WO | 2016101990 | | 6/2016 | |
| WO | 2018162432 | | 9/2018 | |

OTHER PUBLICATIONS

1 Korean Intellectual Property Office Application No. 10-2019-0121755, Office Action dated Apr. 2, 2021, 4 pages.
United States Patent and Trademark Office U.S. Appl. No. 16/987,298, Office Action dated Jan. 21, 2022, 26 pages.
United States Patent and Trademark Office U.S. Appl. No. 16/987,298, Final Office Action dated May 10, 2022, 12 pages.
United States Patent and Trademark Office U.S. Appl. No. 16/987,298, Office Action dated Sep. 22, 2022, 12 pages.
United States Patent and Trademark Office U.S. Appl. No. 16/987,298, Notice of Allowance dated Jan. 25, 2023, 9 pages.

* cited by examiner

SHAVING BLADE

CROSS-REFERENCE TO RELATED APPLICATION

This application is a continuation of U.S. patent application Ser. No. 16/987,298, filed on Aug. 6, 2020, which pursuant to 35 U.S.C. § 119(a), claims the benefit of earlier filing date and right of priority to Korean Patent Application No. 10-2019-0121755, filed on Oct. 1, 2019, the contents of which are hereby incorporated by reference herein in its entirety.

BACKGROUND OF THE INVENTION

1. Field of the Invention

The present disclosure relates to a shaving blade.

2. Description of the Related Art

The statements in this section merely provide background information related to the present disclosure and may not constitute prior art.

The shape of a shaving blade plays an important role in the quality of shaving. In particular, the shape of a cutting edge included in a substrate of the shaving blade greatly affects the cutting force of the shaving blade. Here, the cutting force refers to the force required for the shaving blade to cut one body hair.

As the cutting force of the shaving blade becomes weaker, the body hair may be cut using weaker force, and accordingly the user may feel softer shaving.

In general, the cutting force of the shaving blade decreases as the thickness of the cutting edge becomes thinner. However, in terms of durability of the shaving blade, the cutting edge needs to have a thickness greater than or equal to a certain value.

Accordingly, it is not possible to indefinitely decrease the thickness of the cutting edge to reduce the cutting force. There is a need for a profile design of the cutting edge that may sufficiently reduce the cutting force of the shaving blade even when the thickness of the cutting edge is reduced relatively little.

For conventional shaving blades, people have focused on optimizing the thickness of the cutting edge in an area very close to a substrate tip of the cutting edge, in order to reduce the cutting force of the shaving blade.

Accordingly, research on the thickness of the cutting edge area relatively spaced apart from the substrate tip has not been extensively conducted.

For the conventional shaving blades, people mainly focused on reducing the thickness of the cutting edge as a whole, and the correlation between the thickness of each area of the cutting edge and the cutting force was not considered.

SUMMARY OF THE INVENTION

Therefore, the present disclosure has been made in view of the above problems, and it is an object of the present disclosure to find an area in which a change in the thickness of a shaving blade has the greatest influence on reduction of cutting force by studying a correlation between the thickness of the shaving blade and the cutting force and optimize the thickness of the shaving blade in the area having the greatest influence on the reduction of cutting force to effectively reduce the cutting force of the shaving blade.

In accordance with the present invention, the above and other objects can be accomplished by the provision of a shaving blade including a substrate having a cutting edge provided with a sharp substrate tip, wherein a thickness T16 of the substrate measured at a distance D16 that is 16 micrometers from the substrate tip is in a range from 2.41 micrometers to 3.76 micrometers.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
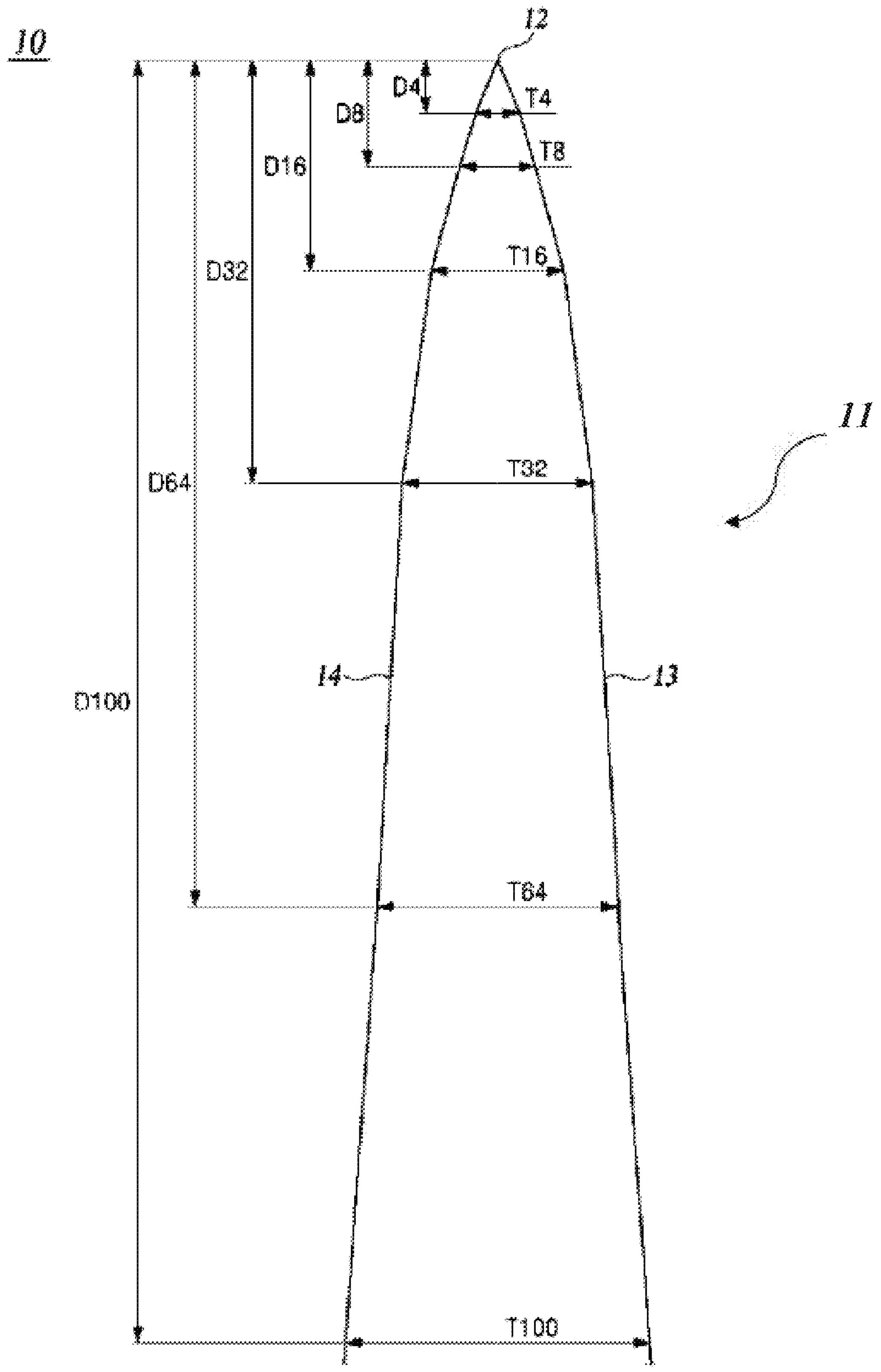
FIG. 1 shows a schematic profile of a cutting edge of a substrate according to an embodiment of the present disclosure.

Hereinafter, some embodiments of the present disclosure will be described in detail with reference to exemplary drawings. It should be noted that in assigning reference numerals to components in each drawing, the same reference numbers will be used throughout the drawings to refer to the same or like components even though the components are shown in different drawings. In addition, in describing the present disclosure, detailed descriptions of related known elements or functions will be omitted to avoid obscuring the subject matter of the present disclosure.

In describing the components of embodiments according to the present disclosure, terms including ordinal numbers such as first, second, i), ii), a), and b) may be used. These terms are merely used to distinguish one component from another, and the essence or order of the components is not limited by the terms. In the specification, when it is stated that a part "includes" or "has" a component, this means that the part may further include other components, rather than excluding other components, unless explicitly stated otherwise.

As used herein, DX refers to a point X micrometers from the substrate tip of the shaving blade on the cutting edge. Also, TX refers to the thickness of the cutting edge at point DX. For example, T16 refers to the thickness of the cutting edge at D16 which is 16 micrometers from the substrate tip of the shaving blade.

FIG. 1 shows a schematic profile of a cutting edge 11 of a substrate 10 according to an embodiment of the present disclosure.

Referring to FIG. 1, a shaving blade may include a substrate 10 having a cutting edge 11 provided with a sharp substrate tip 12.

Both sides 13 and 14 of the cutting edge 11 may have an inclined shape and may converge toward the substrate tip 12, which is formed at one end of the cutting edge 11.

The substrate 10 may be formed of any one of stainless steel, carbon steel, and ceramic, but the present disclosure is not limited thereto.

Both sides 13 and 14 of the cutting edge 11 may include a plurality of facets formed by an abrading wheel.

The facets may include a first facet spaced apart from the substrate tip 12 and a second facet extending from the substrate tip 12. In this case, the second facet may non-uniformly overlap at least a portion of the first facet.

The first facet may be formed by an abrading wheel made of Cubic Boron Nitride (CBN) having relatively rough and coarse grains. In addition, the second facet may be formed by an abrading wheel having relatively fine and dense grains. However, the present disclosure is not limited to this.

The facet may be uniformly formed on the substrate 10 by 300 to 500 micrometers from the substrate tip 12.

The shaving blade according to an embodiment of the present disclosure may effectively reduce the cutting force of the shaving blade by optimizing the thickness of the cutting edge 11 in a section of D16 or higher which has a high correlation with the cutting force of the shaving blade. Details of a process of obtaining a correlation between the cutting force of the shaving blade and the thickness of the cutting edge 11 will be described in Table 1 and the related description below.

TABLE 1

| | T4 | T8 | T16 | T32 | T64 | T100 | Cutting force |
|---|---|---|---|---|---|---|---|
| Comparative Example 1 | 2.04 | 3.55 | 6.59 | 11.83 | 20.89 | 30.72 | 5.90 |
| Comparative Example 2 | 1.69 | 2.98 | 5.44 | 9.76 | 17.65 | 27.57 | 5.63 |
| Comparative Example 3 | 1.96 | 3.49 | 5.91 | 10.67 | 19.38 | 28.82 | 5.55 |
| Comparative Example 4 | 1.67 | 2.99 | 5.44 | 10.07 | 18.1 | 27.21 | 5.42 |
| Comparative Example 5 | 1.65 | 2.99 | 5.32 | 9.41 | 16.32 | 27.21 | 5.42 |
| Comparative Example 6 | 1.83 | 3 | 4.93 | 7.79 | 14.66 | 22.21 | 5.22 |
| Comparative Example 7 | 1.69 | 2.69 | 4.45 | 7.54 | 12.94 | 19.88 | 4.90 |
| Comparative Example 8 | 1.72 | 2.77 | 4.36 | 5.91 | 7.96 | 11.13 | 4.85 |
| Comparative Example 9 | 1.53 | 2.47 | 3.86 | 6.11 | 10.45 | 16.53 | 4.63 |
| Example | 1.49 | 2.08 | 3.42 | 5.91 | 9.84 | 16.2 | 4.30 |

Table 1 shows the thickness of the cutting edge and the cutting force according to the distance from the substrate tip for multiple comparative examples and one embodiment of the present disclosure (hereinafter, Example).

In Table 1, the unit of thickness of the cutting edge is μm, and the unit of cutting force is gf.

The thickness of the cutting edge 11 disclosed in Table 1 was measured using scanning-electron microscopy (SEM). However, the present disclosure is not limited thereto. The thickness of the cutting edge 11 may be measured using an interferometer or confocal microscopy.

Referring to Table 1, the shaving blade of each comparative example may have different thicknesses in the respective sections of the cutting edge. Accordingly, the shaving blades of the comparative examples may have different cutting forces.

For example, the cutting edge 11 of the shaving blade according to the Example has a relatively small thickness compared to the comparative examples, and in particular, in areas of D16 or higher.

Further, referring to Table 1, the cutting edge 11 of the shaving blade according to the Example has a relatively low cutting force compared to the comparative examples.

Figure 2:
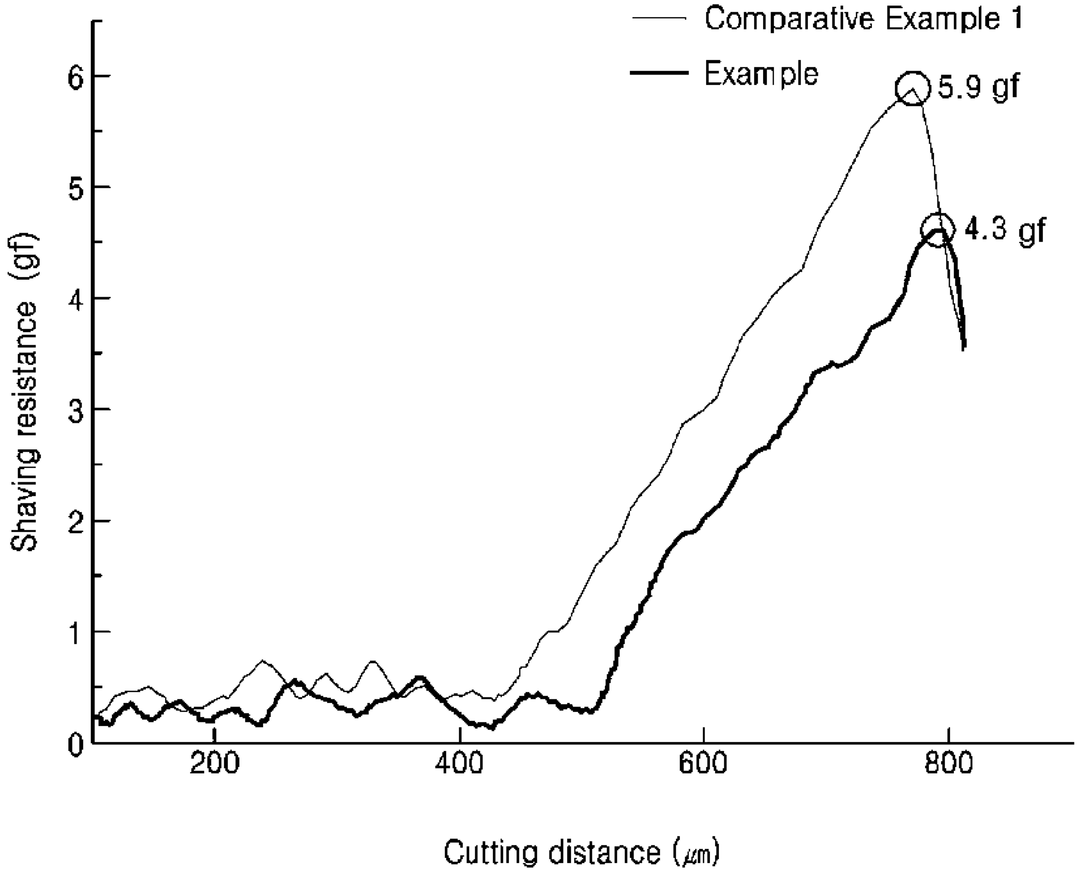
FIG. 2 is a graph depicting the magnitude of shaving resistance with a cutting distance of a shaving blade according to Comparative Example 1 of Table 1 and a shaving blade according to an embodiment of the present disclosure.

FIG. 2 is a graph depicting the magnitude of shaving resistance with a cutting distance of a shaving blade according to Comparative Example 1 of Table 1 and a shaving blade according to an embodiment of the present disclosure.

In this specification, the cutting distance refers to the distance that the cutting edge travels from the time when the cutting edge contacts the body hair until the hair is completely cut off by the cutting edge.

In this specification, shaving resistance refers to the force acting on the shaving blade by body hair during shaving.

Referring to FIG. 2, in the section of cutting distance from 100 to 500 micrometers (μm), the shaving resistance is 1.0 gf or less, and may have a relatively small magnitude.

In this section, the shaving blade may start contacting the body hair. When the shaving blade moves, the body hair in contact with the shaving blade may lie down in the movement direction. In this state, when the shaving blade moves a certain distance, the body hair may be pressed by the shaving blade, and thus, a part of the shaving blade may cut in the surface of the body hair.

In this section, tension does not occur inside the body hair, and accordingly, the magnitude of the shaving resistance may have a relatively small value.

In the section of a cutting distance from 500 to 800 micrometers (μm), the shaving resistance may continue to increase to the highest point.

In this section, the body hair may almost lie down in the movement direction of the shaving blade, with the shaving blade cutting in the body hair. In this case, the body hair may no longer be laid down, and accordingly, tension may occur inside the body hair due to tugging of the shaving blade.

At this time, the shaving blade cutting in the body hair may dig deeper into the body hair, whereby substantial cutting of the body hair may start.

In this section, as the cutting distance increases, the magnitude of the tension acting on the body hair may continue to increase, and accordingly the shaving resistance may also increase. This increase in shaving resistance may be continued until the cutting of the body hair by the shaving blade is completed.

In the section of cutting distance near 800 micrometers (μm), the shaving resistance may reach the highest point and may decrease rapidly after reaching the highest point.

In this section, cutting of the body hair by the shaving blade may be completed. In this case, tugging of the body hair by the shaving blade does not occur, and accordingly the tension acting on the body hair may disappear. Accordingly, the shaving resistance may be drastically reduced.

The highest point of the shaving resistance means the minimum force required for the shaving blade to complete cutting of body hair. Accordingly, the shaving resistance at the highest point may represent the cutting force of the shaving blade.

For example, the cutting force of the shaving blade of Comparative Example 1 is 5.90 gf, and the cutting force of the shaving blade according to the embodiment is 4.30 gf. It may be seen that the cutting force of the shaving blade according to the embodiment is about 27% lower than the cutting force of the shaving blade of Comparative Example 1.

Referring back to Table 1, the cutting force of the shaving blade tends to decrease as the thickness of the cutting edge decreases. Accordingly, in order to reduce the cutting force, it is necessary to design a thin cutting edge.

However, for the durability of the shaving blade, the cutting edge needs to have a thickness equal to or greater than a certain value. In other words, it is not possible to indefinitely reduce the thickness of the cutting edge to reduce the cutting force, and it is necessary to design a profile of the cutting edge that may reduce the cutting force of the shaving blade most efficiently in terms of reduction of the thickness of the cutting edge.

The shaving blade according to an embodiment of the present disclosure has been devised in view of the above, and has a technically meaning in most effectively reducing the cutting force of the shaving blade by optimizing the thickness of a section of D16 or higher, which has a high correlation with the cutting force. Hereinafter, a process of obtaining a correlation between the cutting force of the shaving blade and the thickness of the substrate will be described in detail.

First, using the thickness distribution data about the cutting edge of each comparative example and the cutting force data about each comparative example shown in Table 1, a regression equation of Equation 1 below may be obtained. Equation 1 may approximate the relationship between the cutting force of the shaving blade and the thickness distribution of the cutting edge.

$$\text{Cutting Force}=3.39-0.606*T4-0.354*T8+1.06*T16-0.289*T32+0.048*T64+0.0150*T100\text{(unit: gf)} \quad \text{Equation 1}$$

The data about the multiple comparative examples shown in Table 1 were derived using an actually fabricated specimen, and some of the comparative examples are used in actual razor products. In this aspect, Equation 1 has high reliability, and the result obtained through Equation 1, which will be described later, may also have high reliability.

When the correlation between the thickness in each section of the cutting edge and the cutting force of the cutting edge is obtained using Equation 1, the results in Table 2 below may be obtained.

TABLE 2

| Thickness | T4 | T8 | T16 | T32 | T64 | T100 |
|---|---|---|---|---|---|---|
| Correlation | 0.682 | 0.886 | 0.974 | 0.956 | 0.931 | 0.909 |

The correlation in Table 2 is a numerical representation of the degree of correlation between the change in thickness and the change in cutting force in each section. Therefore, when the correlation of a certain thickness section is low, the degree of change of the cutting force may be relatively small compared to the thickness of another section having a higher correlation even if the thickness of the section changes.

For example, in Table 2, the correlation of T16 is 0.974, which is greater than the correlation of T4, 0.682. Accordingly, the reduction in thickness required to reduce the same cutting force may be smaller at T16 than T4. That is, when the thickness of the shaving blade reduced at T16 and the thickness of the shaving blade reduced at T4 are the same, the effect of reducing the cutting force that may be obtained at T16 is greater than the reduction effect that may be obtained at T4.

Referring to Table 2, the highest correlation is obtained at T16, and the correlation decreases in order of T32, T64, and T100, which are thicknesses of D16 or higher sections away from the substrate tip. At thicknesses T4 and T8 at less than D16 close to the substrate tip 12, the correlation is lower than at the other thicknesses.

To reduce cutting force, conventional shaving blades have been focused on reducing an area of the cutting edge that is very close to the substrate tip. It is found from the experimental data above that the highest correlation is obtained at D16, which is relatively spaced apart from the substrate tip, and a relatively high correlation is obtained in areas beyond D16.

Accordingly, research has been conducted on the thickness of the sections at D16 or a farther distance. Details of a shaving blade according to an embodiment of the present disclosure, derived on the basis of this research, are described below.

In the substrate 10 according to one embodiment of the present disclosure, the thickness of the substrate 10 according to the distance from the substrate tip 12 may be in the range disclosed in Table 3 below.

TABLE 3

| Thickness | Value (unit: μm) |
|---|---|
| T16 | 2.41 to 3.76 |
| T32 | 5.00 to 7.02 |
| T64 | 7.69 to 12.90 |
| T100 | 10.5 to 19.5 |

Referring to Table 3, the thickness T16 of the substrate 10 measured at distance D16, which is 16 micrometers from the substrate tip 12 may be from 2.41 micrometers to 3.76 micrometers, preferably from 3.08 micrometers to 3.76 micrometers.

The thickness T32 of the substrate 10 measured at a distance D32, which is 32 micrometers from the substrate tip 12, may be from 5.00 to 7.02 micrometers.

The thickness T64 of the substrate 10 measured at a distance D64, which is 64 micrometers from the substrate tip 12, may be from 7.69 micrometers to 12.90 micrometers.

The thickness T100 of the substrate 10 measured at a distance D100, which is 100 micrometers from the substrate tip 12, may be from 10.5 micrometers to 19.5 micrometers.

As illustrated in FIG. 1, an average increasing thickness from the thickness T8 of the substrate 10 to the thickness T16 of the substrate 10 is greater than an average increasing thickness from the thickness T16 to the thickness T32 of the substrate 10. In this regard, an average increasing thickness may be obtained by dividing a difference in substrate thicknesses (e.g., the difference between T8 and T16) by a difference in the corresponding distances (e.g., the difference between D8 and D16).

The thickness of a person's body hair is generally about 100 micrometers. That is, a section of the shaving blade that is involved in cutting the body hair in shaving may be within around T100 of the substrate 10.

Accordingly, the thickness section from T16 to T100 is an area actually involved in cutting the body hair on the cutting edge 11, and thus, may have a greater influence on the cutting force of the shaving blade than the thickness in the section beyond T100.

R16 obtained by dividing the thickness T16 measured at a distance D16, which is 16 micrometers from the substrate tip 12, by D16 may be greater than or equal to R100 obtained by dividing the thickness T100 measured at a distance D100, which is 100 micrometers from the substrate tip 12, by D100.

In addition, R16 obtained by dividing the thickness T16 measured at a distance D16, which is 16 micrometers from the substrate tip 12, by D16 may be less than or equal to at least one of R4 obtained by dividing the thickness T4 measured at a distance D4, which is 4 micrometers from the substrate tip 12, by D4 and R8 obtained by dividing the thickness T8 measured at a distance D8, which is 8 micrometers from the substrate tip 12, by D8.

RX, according to its definition, may be proportional to the average slope of both sides 13 and 14 of the cutting edge 11 in the section from the substrate tip 12 to DX. For example, when R16 is greater than R100, this means that the average slope of the cutting edge 11 from the substrate tip 12 to D16 is greater than the average slope of the cutting edge 11 from the substrate tip 12 to D100.

R16 is greater than R100 in the section beyond D16, and less than one or more of R4 and R8, which correspond to the section within D16. Accordingly, the cutting edge 11 may generally have a convex shape in the section from the substrate tip 12 to D100. The convex shape of the substrate 10 may improve the durability and physical properties of the shaving blade.

The difference between the thickness T32 measured at a distance D32, which is 32 micrometers from the substrate tip 12, and the thickness T16 measured at a distance D16, which is 16 micrometers from the substrate tip 12, may be less than or equal to 4.61 micrometers.

In addition, the difference between the thickness T100 measured at a distance D100, which is 100 micrometers from the substrate tip 12, and the thickness T16 measured at distance D16, which is 16 micrometers from the substrate tip 12, may be less than or equal to 17.09 micrometers.

The difference between TX and TY may be proportional to the average slope of both sides 13 and 14 of the cutting edge 11 in the section from DX to DY.

Accordingly, a large difference between TX and TY means that the slope of both sides 13 and 14 of the cutting edge 11 is steep in the section from DX to DY. Conversely, a small difference between TX and TY means that the slope of both sides 13 and 14 of the cutting edge 11 is gentle in the section from DX to DY.

Since the shaving blade according to an embodiment of the present disclosure has a relatively small thickness in the section from T16 to T100, it may have a relatively gentle slope in the section from T16 to T100.

Figure 3:
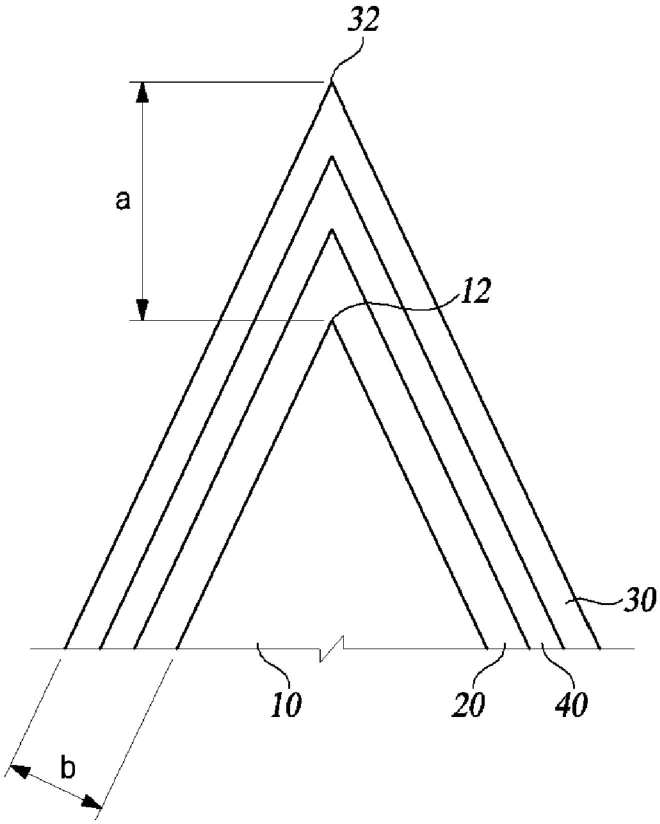
FIG. 3 shows a schematic profile of a cutting edge of a substrate on which a plurality of coating layers is laminated according to an embodiment of the present disclosure.

FIG. 3 shows a schematic profile of a cutting edge 11 of a substrate 10 on which a plurality of coating layers is laminated according to an embodiment of the present disclosure.

Referring to FIG. 3, the shaving blade may include a plurality of coating layers laminated on the substrate 10.

The plurality of coating layers may include a first coating layer 20, a second coating layer 30, and a third coating layer 40. The first coating layer 20, the third coating layer 40, and the second coating layer 30 may be laminated on the substrate 10 in this order.

The first coating layer 20 may be laminated on the surface of the substrate 10 to complement the rigidity of the substrate 10.

The first coating layer 20 may contain one or more of CrB, CrC, and Diamondlike carbon (DLC). However, the present disclosure is not limited thereto.

The thickness of the first coating layer 20 may be from 150 nanometers to 300 nanometers.

When the first coating layer 20 has a thickness of 150 nanometers or less, the durability of the entire shaving blade may follow the behavior of the substrate 10. In this case, an excessive damage may be caused to the substrate 10.

On the other hand, when the first coating layer 20 has a thickness of 300 nanometers or more, the durability of the entire shaving blade may follow the behavior of the first coating layer 20. In this case, the cutting force of the shaving blade may increase, and the first coating layer 20 may be peeled off the surface of the substrate 10.

The second coating layer 30 may be laminated on the third coating layer 40. However, the present disclosure is not limited thereto. For example, the shaving blade may not include the third coating layer 40. In this case, the second coating layer 30 may be directly laminated on the first coating layer 20.

The second coating layer 30 may reduce friction between the shaving blade and the skin.

The second coating layer 30 may contain polytetrafluoroethylene (PTFE). However, the present disclosure is not limited thereto.

The second coating layer 30 may include a blade tip 32 formed at a position corresponding to the substrate tip 12.

A value obtained by dividing the distance (a) between the substrate tip 12 and the blade tip 32 by the vertical height (b) from one surface of the cutting edge to the surface of the second coating layer 30 may be from 1.92 to 2.00.

The multiple coating layers may be laminated on the substrate 10 according to such a ratio, thereby more appropriately reinforcing the durability of the shaving blade.

However, the present disclosure is not limited thereto, and the value obtained by dividing (a) by (b) may be out of the above-described range depending on the angle of the substrate 10, deposition conditions, and physical properties.

The third coating layer 40, which is between the first coating layer 20 and the second coating layer 30, may be laminated on the first coating layer 20, and increase adhesion between the first coating layer 20 and the second coating layer 30.

The third coating layer 40 may include a material containing Cr, which exhibits excellent adhesion. For example, the third coating layer 40 may contain one or more of CrB and CrC. However, the present disclosure is not limited thereto.

The thickness of the third coating layer 40 may be between 5 nanometers and 30 nanometers.

When the third coating layer 40 has a thickness of 5 nanometers or less, the third coating layer 40 may only form a nucleus, but may not form a layer.

On the other hand, when the third coating layer 40 has a thickness of 30 nanometers or more, the cutting force of the shaving blade may increase.

As is apparent from the above description, according to the embodiments, the cutting force of a shaving blade may be effectively reduced, thereby providing a smooth feel of shaving to the user.

With respect to changing numerical range limitations, even though various subranges are not explicitly disclosed, one skilled in the art would clearly understand that subranges/values are contemplated and included in the present disclosure. Thus, any numerical values or sub-ranges within the disclosed ranges would be inherently supported by various ranges disclosed in the specification.

Although exemplary embodiments have been described for illustrative purposes, those skilled in the art to which the present disclosure belongs will appreciate that various modifications and variations can be made without departing from the essential features of the present disclosure. Therefore, the present disclosure is to be construed as illustrative rather than limiting, and the scope of the present disclosure is not limited by the embodiments. The scope of protection of the disclosure should be construed according to the appended claims, and all technical ideas within the scope of the claims and equivalents thereof should be construed as being within the scope of the disclosure.

What is claimed is:

1. A shaving blade for cutting hair, comprising:

a substrate having a cutting edge, a substrate tips, and a plurality of coating layers laminated on the substrate; wherein:

a first thickness of the substrate is defined as a thickness measured at a first distance that is 8 micrometers from the substrate tip along a central axis;

a second thickness of the substrate is defined as a thickness measured at a second distance that is 16 micrometers from the substrate tip along the central axis;

a third thickness of the substrate is defined as a thickness measured at a third distance that is 32 micrometers from the substrate tip along the central axis;

a first difference is defined as a difference between the second thickness and the first thickness;

a second difference is defined as a difference between the second distance and the first distance;

a third difference is defined as a difference between the third thickness and the second thickness;

a fourth difference is defined as a difference between the third distance and the second distance;

a first average increasing thickness is defined as a thickness measured by dividing the first difference by the second difference;

a second average increasing thickness is defined as a thickness measured by dividing the third difference by the fourth difference;

the first average increasing thickness is greater than the second average increasing thickness;

the plurality of coating layers include a first coating layer, a second coating layer, and a third coating layer, the plurality of coating layers contain one or more of chromium boride (CrB), chromium carbide (CrC), or Diamondlike carbon (DLC), side surfaces of the cutting edge are convexly shaped in a region adjacent to the second distance, and the second thickness of the substrate is in a range from 2.41 to 3.76 micrometers, and wherein an outer surface of the substrate from a distance of 32 micrometers from the substrate tip to a distance of 100 micrometers from the substrate tip is linear.

2. The shaving blade of claim 1, wherein the first coating layer is laminated on the substrate, the third coating layer is laminated on the first coating layer and the second coating layer is laminated on the third coating layer, and wherein a thickness of the third coating layer is in a range from 5 nanometers to 30 nanometers.

3. The shaving blade of claim 2, wherein at least one of the first coating layer or the third coating layer contains CrB, and wherein the second coating layer contains polytetrafluoroethylene (PTFE).

4. The shaving blade of claim 1, wherein the second coating layer is laminated on the third coating layer and is configured to reduce friction between the shaving blade and skin of a user.

5. The shaving blade of claim 1, wherein the first coating layer is configured to complement a rigidity of the substrate.

6. The shaving blade of claim 1, wherein the third coating layer is between the first coating layer and the second coating layer, laminated on the first coating layer, wherein the third coating layer is configured to increase adhesion between the first coating layer and the second coating layer, and wherein the third coating layer contains CrB for improved adhesion.

* * * * *